United States Patent
Ryu

(10) Patent No.: US 12,311,483 B2
(45) Date of Patent: May 27, 2025

(54) METHOD OF REPAIRING ROTATING MACHINE PART

(71) Applicant: DOOSAN ENERBILITY CO., LTD., Changwon-si (KR)

(72) Inventor: Sun Woo Ryu, Busan (KR)

(73) Assignee: Doosan Enerbility Co., Ltd., Changwon-si (KR)

(*) Notice: Subject to any disclaimer, the term of this patent is extended or adjusted under 35 U.S.C. 154(b) by 39 days.

(21) Appl. No.: 18/656,264

(22) Filed: May 6, 2024

(65) Prior Publication Data

US 2024/0383079 A1    Nov. 21, 2024

(30) Foreign Application Priority Data

May 18, 2023  (KR) .......................... 10-2023-0064371

(51) Int. Cl.
| | |
|---|---|
| *B23P 6/00* | (2006.01) |
| *B33Y 10/00* | (2015.01) |
| *B33Y 80/00* | (2015.01) |

(52) U.S. Cl.
CPC .............. *B23P 6/002* (2013.01); *B33Y 10/00* (2014.12); *B33Y 80/00* (2014.12)

(58) Field of Classification Search
CPC .......... B23P 6/002; B33Y 10/00; B33Y 80/00
See application file for complete search history.

(56) References Cited

U.S. PATENT DOCUMENTS

2019/0345826 A1* 11/2019 Packer ................. B23K 1/0018
2023/0383659 A1* 11/2023 Ozbaysal ................ F01D 5/005

FOREIGN PATENT DOCUMENTS

| JP | 2015507697 A | * | 3/2015 | ............ C22C 38/00 |
| KR | 10-1495026 B1 | | 2/2015 | |

* cited by examiner

*Primary Examiner* — Jason L Vaughan
(74) *Attorney, Agent, or Firm* — Shook, Hardy & Bacon L.L.P.

(57) ABSTRACT

A method of repairing a rotating machine part. The method includes removing a damaged portion of a front end of an airfoil part of the rotating machine part, manufacturing a repair coupon having the same shape as the removed damaged portion by using a base material in an additive manufacturing method, and coupling the repair coupon manufactured through the manufacturing of the repair coupon to the front end of the airfoil part. Accordingly, after the damaged portion of the front end of the airfoil part of the rotating machine part is removed, the repair coupon having the same shape as the removed damaged portion is manufactured in the additive manufacturing method and then is coupled to the front end of the airfoil part from which the damaged portion is removed so that the front end of the rotating machine part can be easily repaired.

11 Claims, 6 Drawing Sheets

METHOD OF REPAIRING ROTATING MACHINE PART

CROSS REFERENCE TO RELATED APPLICATION

The present application claims priority to Korean Patent Application No. 10-2023-0064371, filed on May 18, 2023, the entire contents of which are incorporated herein for all purposes by this reference.

BACKGROUND

1. Technical Field

The present disclosure relates to a method of repairing a rotating machine part. More particularly, the present disclosure relates to a method of repairing a rotating machine part, in which a damaged portion of a front end of an airfoil part of the rotating machine part is repaired by using a repair coupon.

2. Description of the Background Art

In a turbomachinery, such as a gas turbine engine, air is pressurized inside a compressor section and then mixed with fuel and burned inside a combustion section to produce high temperature combustion gases. High temperature combustion gases are expanded inside a turbine section of an engine in which energy is extracted from the combustion gases to produce useful work, such as powering a compressor section and rotating a generator to generate electricity.

The high temperature combustion gases generated inside the combustion section move through a series of turbine stages inside the turbine section. The turbine stages may include a row of rotating airfoil assemblies, that is, turbine blades, followed by a row of stationary airfoil assemblies, that is, vanes. The turbine blades extract energy from the high temperature combustion gases to power the compressor section and provide output power thereto.

One type of an airfoil assembly, that is, a turbine blade includes an airfoil extending from a radially inner platform at a root end to a radially outer portion of the airfoil, and opposing pressure and suction sidewalls that meet at the leading and trailing edges of the airfoil. After periods of use, areas adjacent to locations at which the airfoil intersects the platform are damaged or ruptured due to overheating and oxidation, requiring repair/replacement processes.

SUMMARY

Accordingly, the present disclosure has been made keeping in mind the above problems occurring in the related art, and an objective of the present disclosure is to provide a method of repairing a rotating machine part, in which after a damaged portion of a front end of an airfoil part of the rotating machine part is removed, a repair coupon having the same shape as the removed damaged portion is manufactured in an additive manufacturing method, and then is coupled to the front end of the airfoil part from which the damaged portion is removed so that the front end of the rotating machine part can be repaired.

In order to achieve the above objective, according to an embodiment of the present disclosure, there is provided a method of repairing a rotating machine part, the method including: removing a damaged portion of a front end of an airfoil part of the rotating machine part; manufacturing a repair coupon having the same shape as the removed damaged portion by using a base material in an additive manufacturing method; and coupling the repair coupon manufactured through the manufacturing of the repair coupon to the front end of the airfoil part.

In the method of repairing a rotating machine part according to the present disclosure, the base material may include carbon 0~0.025 wt %, manganese 0~1.00 wt %, silicon 0.75~1.00 wt %, phosphorus 0~0.040 wt %, sulfur 0~0.040 wt %, chromium 24.50%~26.50 wt %, nickel 9.50~11.50 wt %, tungsten 7.00~8.00 wt %, boron 0.005~0.015 wt %, iron 0~2.00 wt %, and cobalt 51.88~51.245 wt %.

The airfoil part may be formed of a nickel-based superalloy, and the base material may be a cobalt-chromium-molybdenum (CoCrMo) alloy.

The airfoil part may include: a leading edge located on the front end of the airfoil part in which combustion gas flows; a trailing edge arranged on a rear end of the leading edge; and a pressure side and a suction side extending between the leading edge and the trailing edge, wherein during the removing of the damaged portion of the airfoil part, the leading edge may be removed.

The airfoil part may further include a coupling means formed on a rear end of the repair coupon and inserted into the airfoil part, and the coupling means may be formed by extending from the rear end of the repair coupon toward the airfoil part and bending to the inside of the repair coupon.

The coupling means may include: a first coupling means located on a first rear end of the repair coupon and coupled to the pressure side; and a second coupling means provided to correspond to the first coupling means, with the second coupling means being located on a second rear end of the repair coupon and coupled to the suction side, wherein the first coupling means and the second coupling means may respectively include: restraining ends in close contact with inner sides of the pressure side and the suction side to restrain movement of the repair coupon; and connecting ends configured to connect the first rear end and second rear end of the repair coupon with the restraining ends, respectively.

The manufacturing of the repair coupon may include: manufacturing an exterior of the repair coupon manufactured by using the base material in the additive manufacturing method so that a plurality of cooling holes is formed through a peripheral surface of the repair coupon; and forming the plurality of cooling holes uniformly in the repair coupon manufactured through the exterior manufacturing of the repair coupon, and during the forming of the cooling holes, the cooling holes may be formed by using one processing method of electrical discharge machining (EDM), wire processing, and drill processing methods.

Each of the cooling holes formed through the peripheral surface of the repair coupon may be formed such that an area of the cooling hole at an outer side of the peripheral surface of the repair coupon is equal to or greater than an area of the cooling hole at an inner side of the peripheral surface of the repair coupon.

The coupling of the repair coupon may include: mounting the repair coupon by mounting the coupling means provided on the rear end of the repair coupon to an inner side of each of the pressure side and the suction side; and welding the repair coupon by welding a close-contact portion of the coupling means with a front end of each of the pressure side and the suction side by using one method selected among welding, blazing, and soldering.

The method of repairing a rotating machine part according to the present disclosure may further include: heat treating the repair coupon performed before the coupling of the repair coupon after the manufacturing of the repair coupon to heat treat the repair coupon manufactured through the manufacturing of the repair coupon.

According to the method of repairing a rotating machine part according to the present disclosure, after the damaged portion of the front end of the airfoil part of the rotating machine part is removed, the repair coupon having the same shape as the removed damaged portion is manufactured in an additive manufacturing method and then is coupled to the front end of the airfoil part from which the damaged portion is removed so that the front end of the rotating machine part can be easily repaired, due to the coupling means formed on the rear end of the repair coupon, the repair coupon can be easily coupled to the pressure side and the suction side of the airfoil part, and due to the coupling means, the welding or brazing section of the repair coupon and the airfoil part can be minimized.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings. Prior to this, terms and words used in this specification and claims should not be construed as limited to their usual or dictionary meanings, and based on the principle that the inventor can appropriately define the concepts of the terms in order to explain his or her invention in the best way, the terms are required to be interpreted as meanings and concepts consistent with the technical idea of the present disclosure.

Referring to FIGS. 1 to 8, a method of repairing a rotating machine part according to an embodiment of the present disclosure includes removing a damaged portion of an airfoil part at S100, manufacturing a repair coupon at S200, and coupling the repair coupon at S300, and may further include heat treating the repair coupon at S400.

Figure 4:
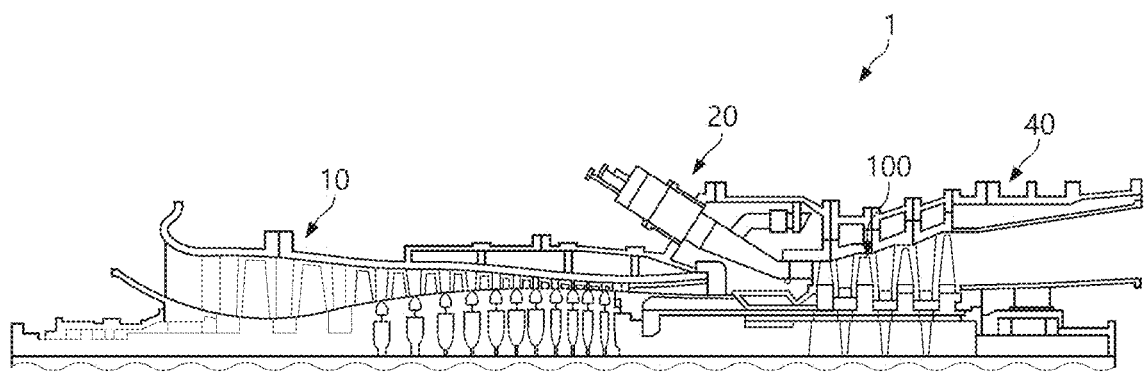
FIG. 4 is a view illustrating a gas turbine or combustion turbine engine provided with the rotating machine part repaired by the method of repairing a rotating machine part illustrated in FIG. 1.

Referring to FIG. 4, a rotating machine part 100 is provided in a gas turbine or combustion turbine engine 1 including a compressor section 10, a combustion section 20, and a turbine section 30, and while the gas turbine or combustion turbine engine 1 operates, atmospheric air is sucked into the compressor section 10 and compressed.

A portion of air compressed in the compressor section 10 is mixed with fuel and burned in the combustion section 20 to produce high temperature combustion products. The combustion products are mixed with the remaining compressed air to form exhaust gas, and then the exhaust gas passes through the turbine section 30.

The exhaust gas expands inside the turbine section 30, generating torque to power any auxiliary equipment, such as a generator, and the compressor section 10 attached to the gas turbine or combustion turbine engine 1.

The exhaust gas enters the turbine section 30 at a high temperature (1000° F., 538° C. or more), so that the rotating machine part 100, including turbine blades and vanes, is exposed to high temperatures. Accordingly, the rotating machine part 100 is required to be manufactured from materials suitable for such temperatures.

Figure 5:
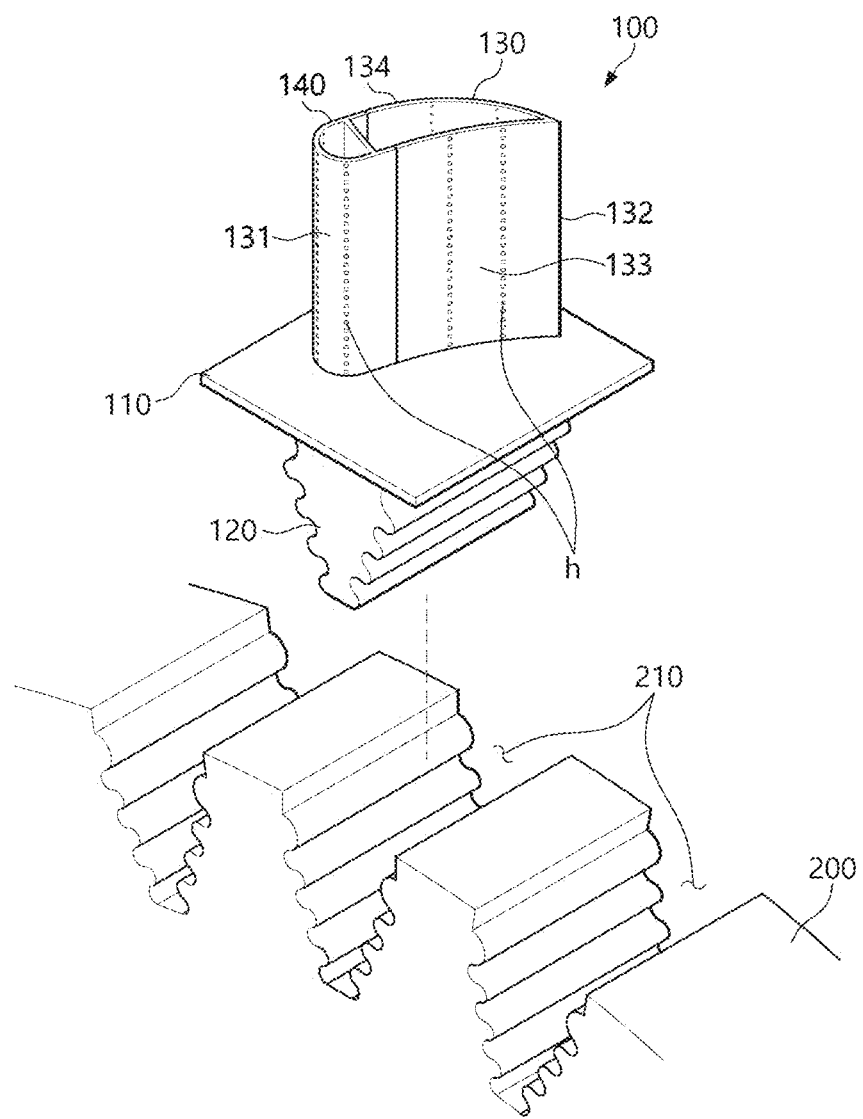
FIG. 5 is an exploded perspective view illustrating the rotating machine part illustrated in FIG. 4.

Referring to FIG. 5, a turbine blade which is the rotating machine part 100 may include a plurality of turbine blades, and the turbine blades may be formed radially along the rotational direction of a turbine rotor by being coupled to a plurality of coupling slots 210 formed in a turbine rotor disk 200.

The turbine blade which is the rotating machine part 100 includes a plate-shaped turbine blade platform part 110, a turbine blade root part 120 coupled to one of the coupling slots 210 by extending from the turbine blade platform part 110, and an airfoil part 130 extending from the turbine blade platform part 110 toward a centrifugal side in the rotation radial direction of the turbine rotor, which is a direction opposite to the turbine blade root part 120. Since a structure in which the turbine blade is coupled to the turbine rotor is general, detailed description thereof will be omitted.

Although the rotating machine part 100 is described as the turbine blade, the rotating machine part 100 is not limited thereto, and may also comprise a turbine vane, a compressor vane, and a compressor blade, etc.

Figure 6:
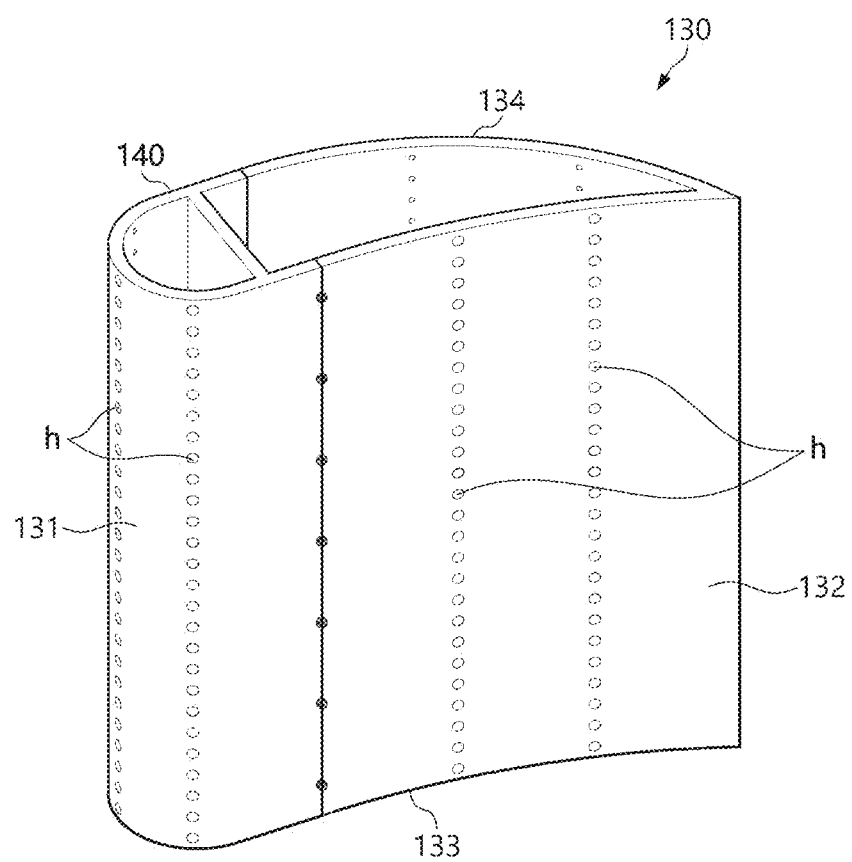
FIG. 6 is an enlarged view of an airfoil part illustrated in FIG. 5.
Figure 7:
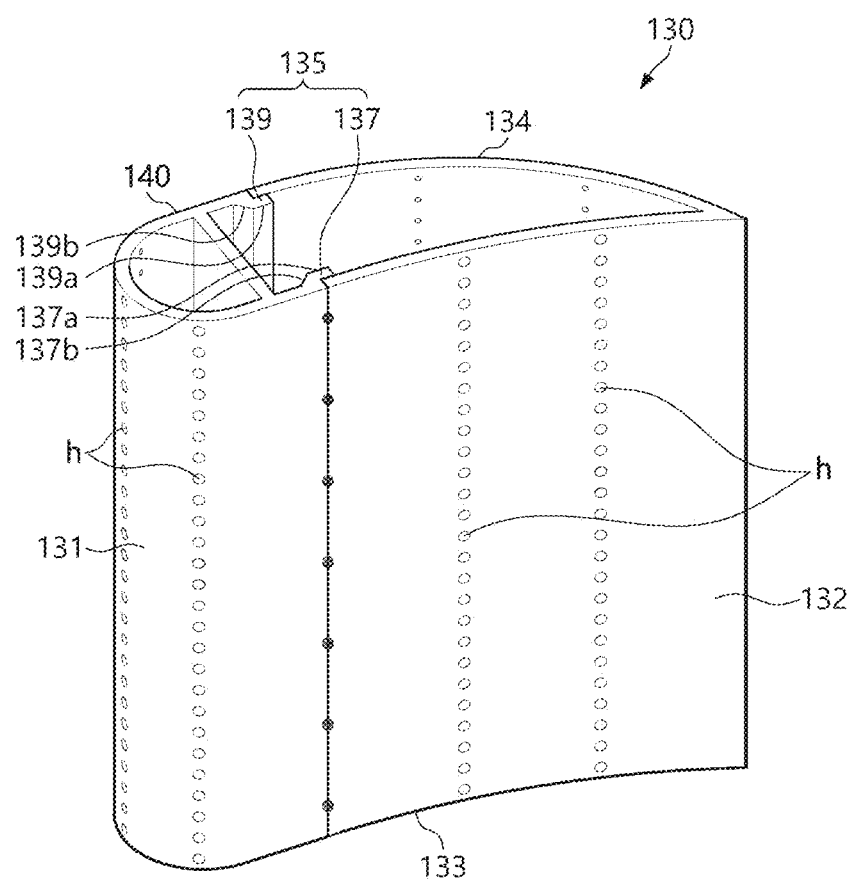
FIG. 7 is an enlarged view of an airfoil part of an embodiment different from the airfoil part illustrated in FIG. 6.

Referring to FIG. 6, the airfoil part 130 includes a leading edge 131 located on a front of the airfoil part 130 in which combustion gas flows, a trailing edge 132 arranged on a rear end of the airfoil part 130, and a pressure side 133 and a suction side 134 extending between the leading edge 131 and the trailing edge 132. Referring to FIG. 7, the airfoil part 130 may further include a coupling means 135 formed on a rear end of a repair coupon 140 coupled to the damaged portion of the airfoil part 130.

The turbine blade which is the rotating machine part 100 may be damaged due to collision of foreign matters, high temperature operation, fatigue, creep, and oxidation, etc. while the gas turbine or combustion turbine engine 1 is operating, and a portion of the turbine blade that is easily damaged is the leading edge 131 of the airfoil part 130.

Figure 1:
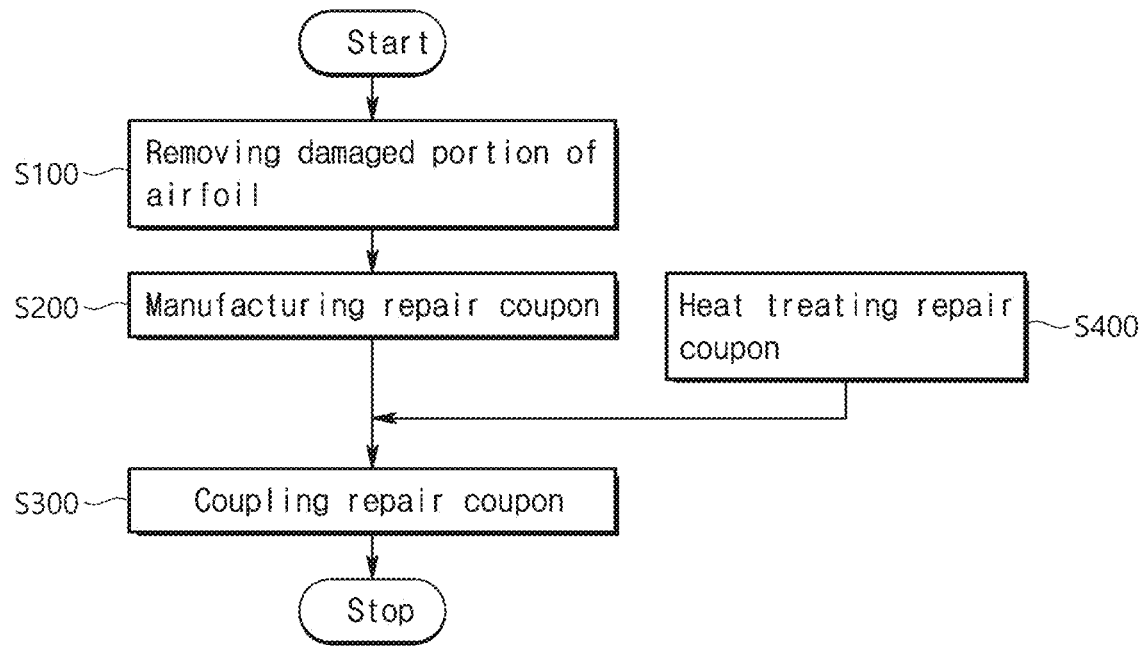
FIG. 1 is a flowchart schematically illustrating the sequence of a method of repairing a rotating machine part according to an embodiment of the present disclosure.

Referring to FIGS. 1 and 5, the removing of the damaged portion of the airfoil part at S100 may include removing a portion of the front end of the airfoil part 130 which is easily damaged in the turbine blade which is the rotating machine part 100, and the leading edge 131 arranged on the front end of the airfoil part 130 which is easily damaged in the turbine blade is preferably removed.

After the removing of the damaged portion of the airfoil part at S100, the manufacturing of the repair coupon at S200 is preferably performed. The manufacturing of the repair coupon at S200 is manufacturing the repair coupon 140 having the same shape as the removed damaged portion by using a base material in an additive manufacturing method.

The base material used to manufacture the repair coupon 140 includes carbon 0~0.025 wt %, manganese 0~1.00 wt %, silicon 0.75~1.00 wt %, phosphorus 0~0.040 wt %, sulfur 0~0.040 wt %, chromium 24.50%~26.50 wt %, nickel 9.50~11.50 wt %, tungsten 7.00~8.00 wt %, boron 0.005~0.015 wt %, iron 0~2.00 wt %, and cobalt 51.88~51.245 wt %, and the airfoil part 130 is preferably formed of a nickel-based superalloy.

The base material is described to include carbon 0~0.025 wt %, manganese 0~1.00 wt %, silicon 0.75~1.00 wt %, phosphorus 0~0.040 wt %, sulfur 0~0.040 wt %, chromium 24.50%~26.50 wt %, nickel 9.50~11.50 wt %, tungsten 7.00~8.00 wt %, boron 0.005~0.015 wt %, iron 0~2.00 wt %, and cobalt 51.88~51.245 wt %, but is not limited thereto. The base material may be a cobalt-chromium-molybdenum (CoCrMo) alloy.

Figure 2:
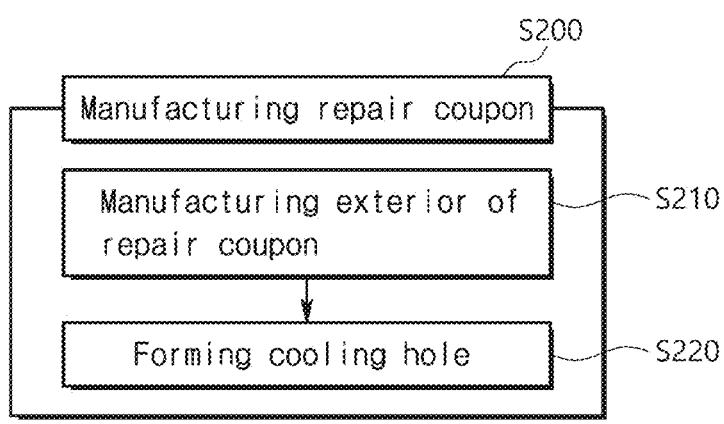
FIG. 2 is a flowchart illustrating the detailed sequence of the manufacturing of a repair coupon illustrated in FIG. 1.

Referring to FIGS. 2, 5, and 6, the manufacturing of the repair coupon 140 in the additive manufacturing method by using the base material at S200 includes the manufacturing of an exterior of the repair coupon at S210 and the forming of cooling holes at S220.

The manufacturing of the exterior of the repair coupon at S210 is the additive manufacturing of the repair coupon 140 by using the base material so that a plurality of cooling holes h is formed through a peripheral surface of the repair coupon.

The repair coupon 140 manufactured through the manufacturing of the exterior of the repair coupon at S210 has cooling holes h formed in the front end and opposite side surfaces thereof, wherein the cooling holes h is preferably formed as the same time at which the repair coupon 140 is manufactured. In order to prevent damage to the repair coupon when the rotating machine part 100 operates at a high temperature of approximately 1400° C. or higher, the cooling holes h are formed in the peripheral surface of the repair coupon 140 in a height direction thereof so that a thin air film is formed on the peripheral surface of the repair coupon 140 by discharging air of the inside of the repair coupon to the outside of the repair coupon 140 through the cooling holes h.

After the exterior manufacturing of the repair coupon at S210, the forming of cooling holes is performed at S220. The forming of cooling holes at S220 is the forming of the plurality of cooling holes h uniformly in the repair coupon 140 manufactured through the exterior manufacturing of the repair coupon at S210.

Since each of the cooling holes h formed in the repair coupon 140 is small, it is difficult to form the cooling hole into a desired shape when manufacturing the repair coupon 140 by additive manufacturing of base materials. Accordingly, due to the performance of the forming of cooling holes at S220, each of the cooling holes h can be formed into a desired shape, and during the forming of cooling holes at S210, the cooling holes h are preferably formed by using one processing method of electrical discharge machining (EDM), wire processing, and drill processing methods.

Figure 8:
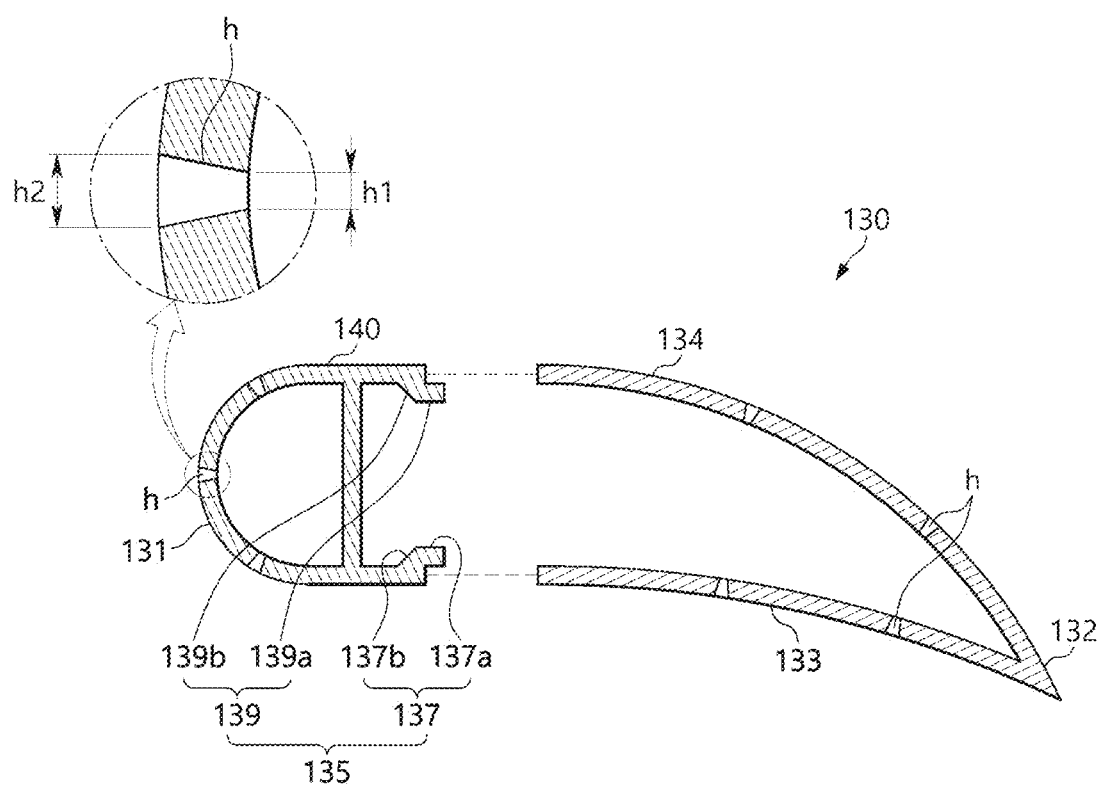
FIG. 8 is a view schematically illustrating a process in which the repair coupon illustrated in FIG. 7 is coupled to the airfoil part.

Referring to FIG. 8, the cooling hole h formed through the peripheral surface of the repair coupon 140 is preferably formed such that an area h2 of the cooling hole h at the outer side of the peripheral surface is equal to or greater than an area h1 of the cooling hole h at the inner side of the peripheral surface of the repair coupon 140, and cooling holes h formed in the pressure side 133 and the suction side 134 of the airfoil part 130 preferably have the same shapes as the cooling holes h formed in the peripheral surface of the repair coupon 140. Since the cooling hole h is formed to have the area h2 at the outer side of the peripheral surface equal to or greater than the area h1 at the inner side of the peripheral surface, a minimum cooling fluid flow rate appropriately covers the outer sides of the peripheral surfaces of the repair coupon 140 and the airfoil part 130, thereby increasing a cooling effect.

Referring to FIGS. 1 and 6, after the manufacturing of the repair coupon at S200, the coupling of the repair coupon at S300 is performed. The coupling of the repair coupon at S300 is the coupling of the repair coupon 140 manufactured through the manufacturing of the repair coupon at S200 to the front end of the airfoil part 130.

Referring to FIGS. 2, 7, and 8, the repair coupon 140 manufactured through the manufacturing of the repair coupon at S200 has the coupling means 135 formed on the rear end thereof, wherein the coupling means 135 is inserted into the airfoil part 130 whose front end is partially removed.

Referring to FIGS. 7 and 8, the coupling means 135 is formed by extending from the rear end of the repair coupon 140 toward the airfoil part 130 whose front end is partially removed and bending to the inside of the repair coupon 140.

The coupling means 135 includes a first coupling means 137 and a second coupling means 139, wherein the first coupling means 137 and the second coupling means 139 are preferably formed to correspond to the rear ends of the repair coupon 140, respectively.

The first coupling means 137 is located on a first rear end of the repair coupon 140 and coupled to the pressure side 133 of the airfoil part 130, and the second coupling means 139, which is provided to correspond to the first coupling means 137, is located on a second rear end of the repair coupon 140 and coupled to the suction side 134 of the airfoil part 130.

The first coupling means 137 includes a restraining end 137*a* and a connecting end 137*b*, wherein the restraining end 137*a* is in close contact with the inside of the pressure side 133 and serves to restrain the movement of the repair coupon 140, and the first rear end and restraining end 137*a* of the repair coupon 140 are connected to each other by the connecting end 137*b*.

The second coupling means 139 includes a restraining end 139*a* and a connecting end 139*b*. Due to the formation of the restraining end 137*a* of the first coupling means 137 and the restraining end 139*a* of the second coupling means 139, the left and right movements of the repair coupon 140 are restricted. Due to the restraint of the left and right movements of the repair coupon 140, the repair coupon 140 coupled to the airfoil part 130 whose front end is partially removed has structural stability.

Figure 3:
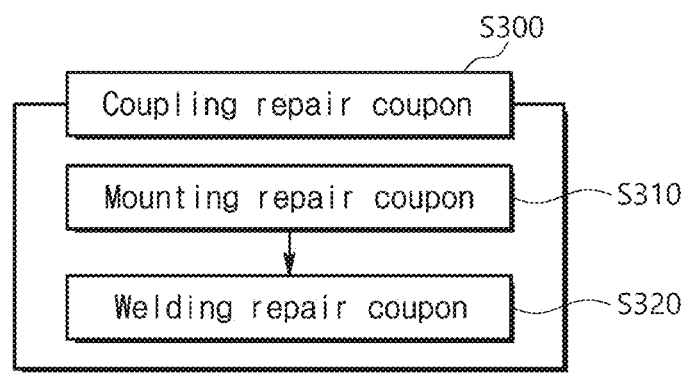
FIG. 3 is a flowchart illustrating the detailed sequence of the coupling of the repair coupon illustrated in FIG. 1.

Referring to FIGS. 3, 7, and 8, the coupling of the repair coupon at S300 includes mounting the repair coupon at S310 and welding the repair coupon at S320. The mounting of the repair coupon at S210 is the mounting of the coupling means 135 provided on the rear end of the repair coupon 140 to the inner side of each of the pressure side 133 and the suction side 134. Due to the mounting of the coupling means 135 to the inside of each of the pressure side 133 and the suction side 134, the left and right movements of the repair coupon 140 are restrained, and the primary coupling of the coupling means 135 is performed.

After the mounting of the repair coupon at S310, the welding of the repair coupon at S320 is performed. The welding of the repair coupon at S320 is the welding of the close-contact portion of the coupling means 135 with the front end of each of the pressure side 133 and the suction side 134. Due to the welding of the repair coupon at S320, the repair coupon 140 can be finally mounted more securely on the airfoil part 130. Additionally, due to the welding of the close-contact portion of the coupling means 135 with the pressure side 133 and the suction side 134 by selecting one method among welding, brazing, and soldering, a welding or brazing section of the repair coupon and the airfoil part can be minimized, so when the repair coupon 140 is damaged, the damaged repair coupon 140 can be easily removed from the airfoil part 130.

Before the coupling of the repair coupon at S300 after the manufacturing of the repair coupon at S200, the heat treating of the repair coupon at S400 is preferably performed. The heat treating of the repair coupon at S400 is the heat treating of the repair coupon 140 manufactured through the manufacturing of the repair coupon at S200. The heat treating of the repair coupon 140 is a general process, and thus detailed description thereof will be omitted.

Accordingly, after a damaged portion of the front end of the airfoil part 130 of the rotating machine part 100 is removed, the repair coupon 140 having the same shape as the removed damaged portion is manufactured in the additive manufacturing method and then is coupled to the front end of the airfoil part 130 from which the damaged portion is removed, thereby enabling the front end of the rotating machine part 100 to be easily repaired, the coupling means 135 is formed on the rear end of the repair coupon 140, thereby enabling the repair coupon to be coupled to the pressure side 133 and the suction side 134 of the airfoil part 130, and the welding or brazing section of the repair coupon 140 and the airfoil part 130 can be minimized by the coupling means 135.

The present disclosure has been described with reference to the embodiments illustrated in the drawings, but these embodiments are merely illustrative, and those skilled in the art will understand that various modified embodiments and equivalent other embodiments are possible therefrom. Therefore, the scope of technical protection of the present disclosure should be determined by the technical spirit of the attached claims.

The invention claimed is:

1. A method of repairing a rotating machine part, the method comprising:
    removing a damaged portion of a front end of an airfoil part of the rotating machine part, the damaged portion having a shape;
    manufacturing a repair coupon having the shape of the damaged portion using a base material in an additive manufacturing method;
    coupling the repair coupon to the front end of the airfoil part,
    wherein the repair coupon comprises a coupling means formed on a rear end of the repair coupon,
    wherein when the repair coupon and the airfoil part are coupled, the coupling means extends from the rear end of the repair coupon to a position interior to and adjacent to the airfoil part, and
    wherein the coupling means is offset inwardly from a suction side of the airfoil part and a pressure side of the airfoil part.

2. A method of repairing a rotating machine part, the method comprising:
    removing a damaged portion of a front end of an airfoil part of the rotating machine part, the damaged portion having a shape;
    manufacturing a repair coupon having the shape of the damaged portion using a base material in an additive manufacturing method;
    coupling the repair coupon to the front end of the airfoil part,
    wherein the base material comprises carbon 0~0.025 wt %, manganese 0~1.00 wt %, silicon 0.75~1.00 wt %, phosphorus 0~0.040 wt %, sulfur 0~0.040 wt %, chromium 24.50%~26.50 wt %, nickel 9.50~11.50 wt %, tungsten 7.00~8.00 wt %, boron 0.005~0.015 wt %, iron 0~2.00 wt %, and cobalt 51.88~51.245 wt %.

3. The method of claim 1, wherein the airfoil part is formed of a nickel-based superalloy, and the base material is a cobalt-chromium-molybdenum (CoCrMo) alloy.

4. The method of claim 1, wherein the airfoil part comprises:
    a leading edge located on the front end of the airfoil part in which combustion gas flows;
    a trailing edge arranged on a rear end of the leading edge; and
    a pressure side and a suction side extending between the leading edge and the trailing edge,
    wherein during the removing of the damaged portion of the airfoil part, the leading edge is removed.

5. The method of claim 1, wherein the coupling means comprises:
    a first coupling means connecting and extending from a first rear end of the repair coupon to a first restraining end, wherein the first restraining end is coupled to an inner side of the pressure side of the airfoil part; and
    a second coupling means connecting and extending from a second rear end of the repair coupon to a second restraining end, wherein the second restraining end is coupled to an inner side of the suction side of the airfoil part.

6. The method of claim 5, wherein the coupling of the repair coupon comprises:
    mounting the repair coupon to the airfoil part such that the first restraining end is positioned adjacent to the inner side of the pressure side, and the second restraining end is positioned adjacent to the inner side of the suction side; and
    coupling the repair coupon to the airfoil part by welding, blazing, or soldering a close-contact portion of the coupling means with a front end of each of the pressure side and the suction side.

7. The method of claim 1, wherein the manufacturing of the repair coupon further comprises:
    forming a plurality of cooling holes, wherein
    the plurality of cooling holes are uniformly formed in the repair coupon.

8. The method of claim 7, wherein the plurality of cooling holes are formed by one of electrical discharge machining (EDM), wire processing, or drill processing.

9. The method of claim 7, wherein each of the plurality of cooling holes formed through the peripheral surface of the repair coupon has an area of the cooling hole at an outer side of the peripheral surface of the repair coupon equal to or greater than an area of the cooling hole at an inner side of the peripheral surface of the repair coupon.

10. The method of claim 1, further comprising:
    heat treating the repair coupon before coupling the repair coupon to the front end of the airfoil part.

11. A method of repairing a rotating machine part, the method comprising:
    removing a damaged portion of a front end of an airfoil part of the rotating machine part, the damaged portion having a shape;

manufacturing a repair coupon having the shape of the damaged portion using a base material in an additive manufacturing method;
coupling the repair coupon to the front end of the airfoil part;
wherein the repair coupon comprises a flange formed on a rear end of the repair coupon;
wherein when the repair coupon and the airfoil part are coupled, the flange extends from the rear end of the repair coupon to a position interior to and adjacent to the airfoil part; and
wherein the flange is offset inwardly from a suction side of the airfoil part and a pressure side of the airfoil part.

* * * * *